Oct. 21, 1930.                R. DIEHL                1,779,160
                    HIGH ALTITUDE FLYING MACHINE
                Filed April 19, 1929        4 Sheets-Sheet 1
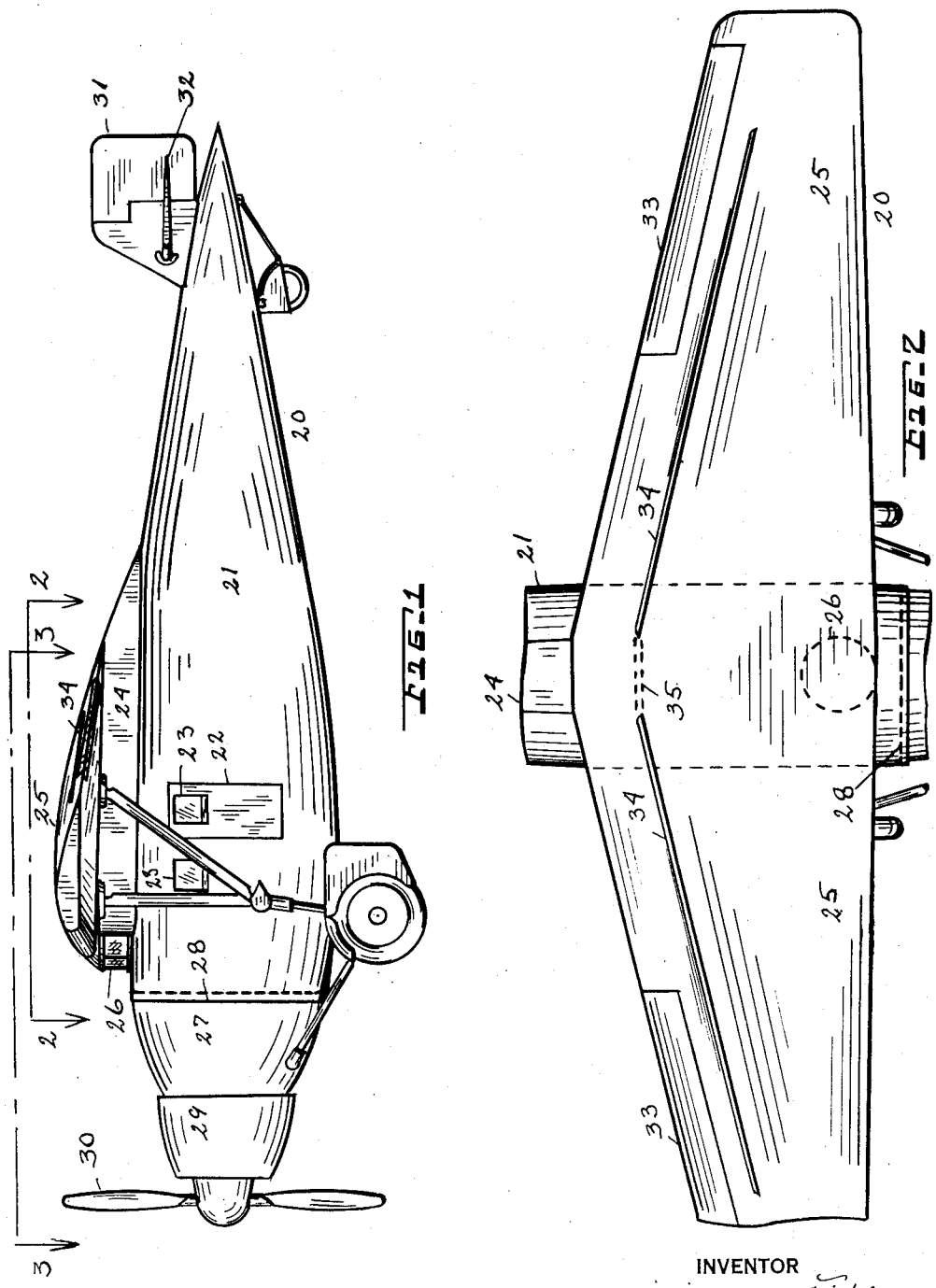
INVENTOR
Richard Diehl.

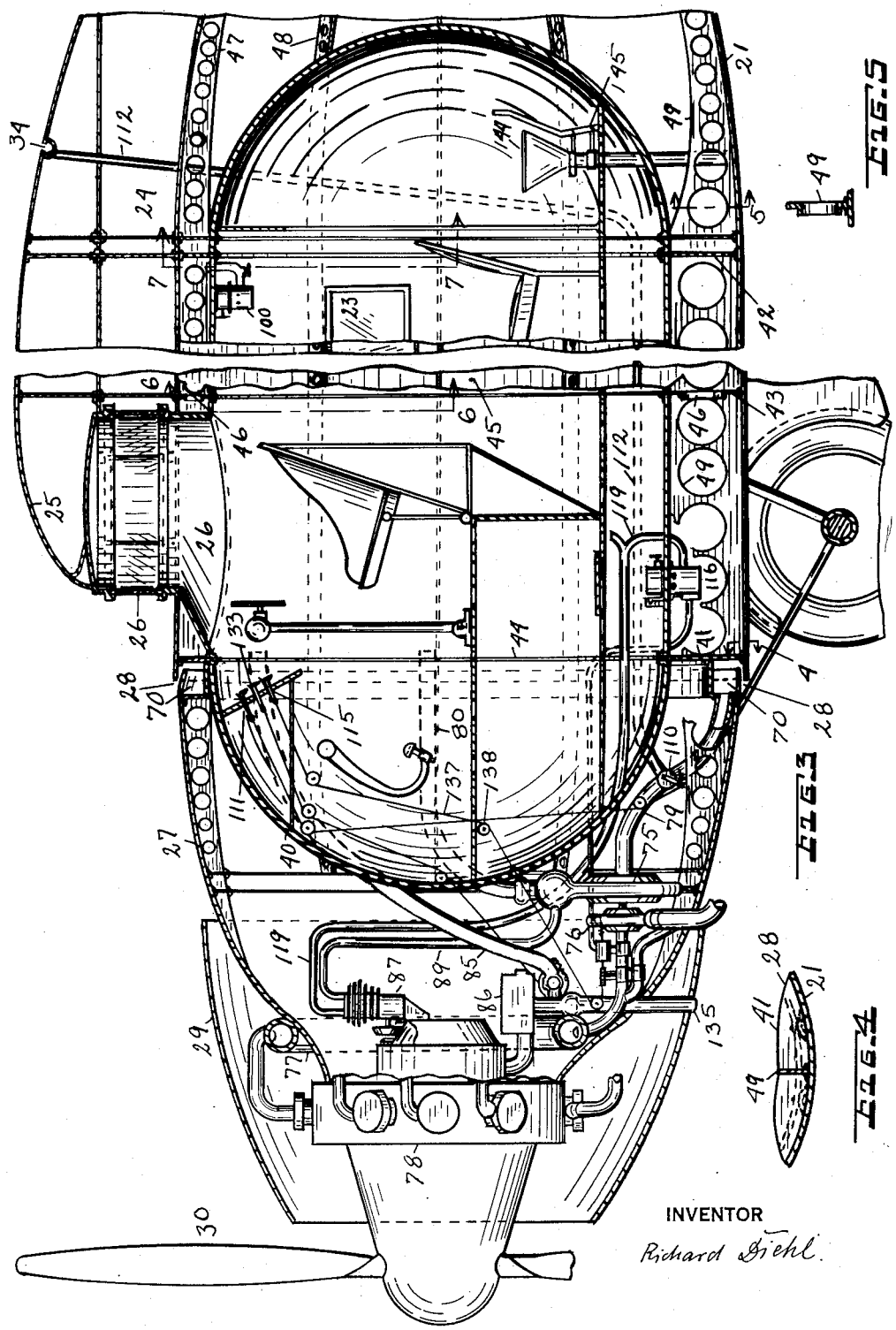

Oct. 21, 1930.    R. DIEHL    1,779,160
HIGH ALTITUDE FLYING MACHINE
Filed April 19, 1929    4 Sheets-Sheet 3
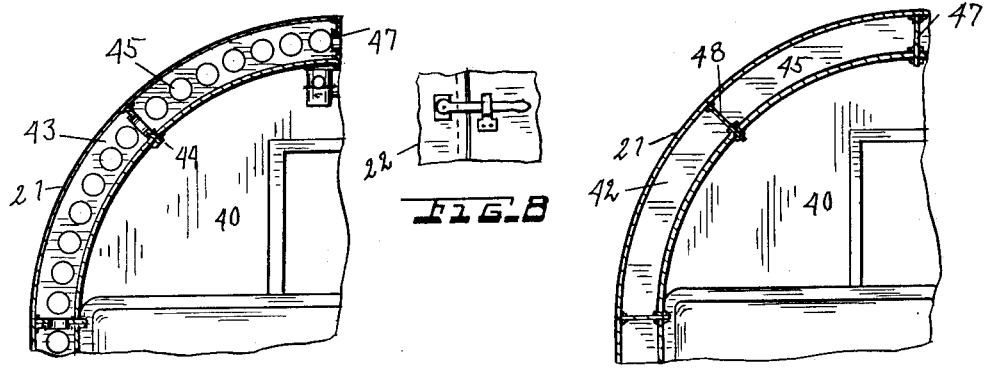
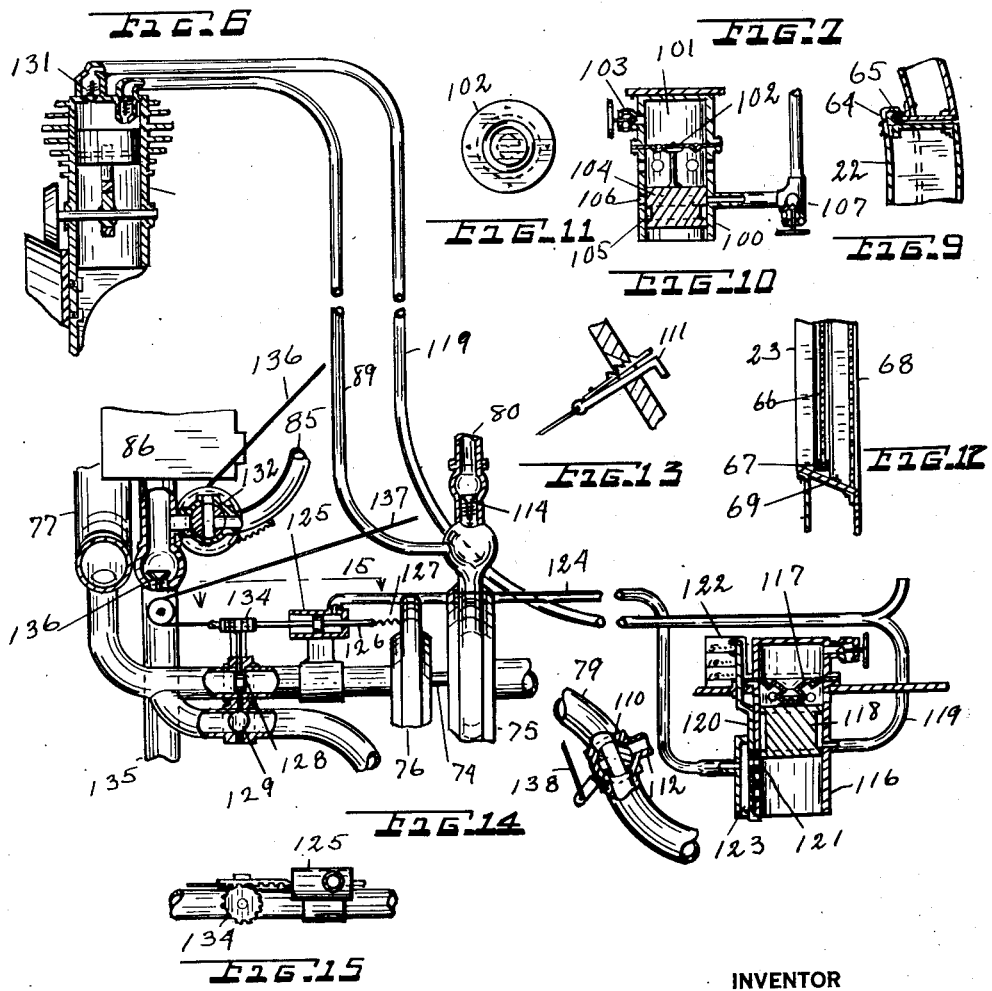
INVENTOR
Richard Diehl.

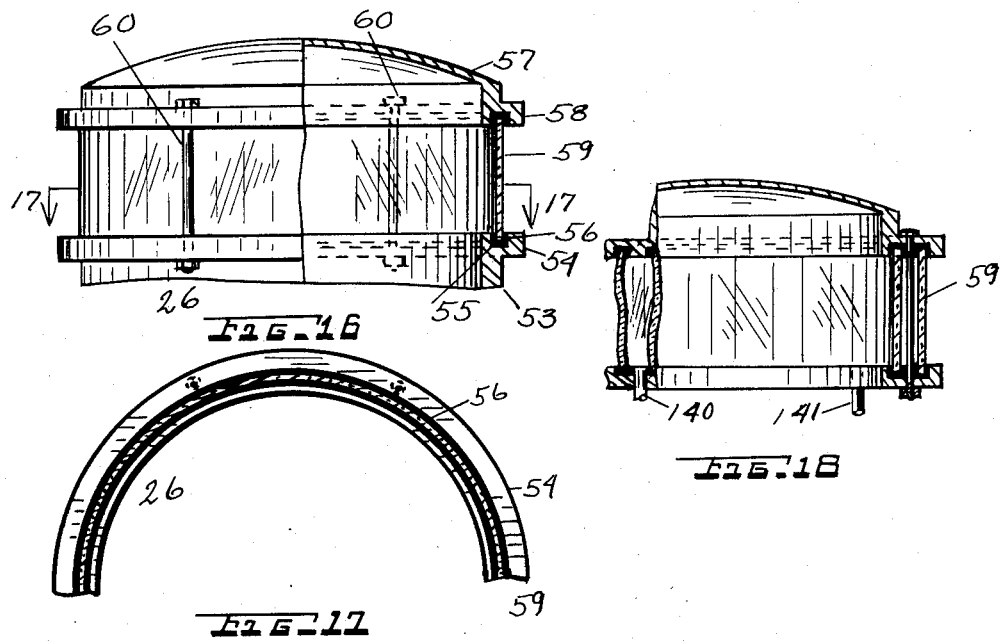
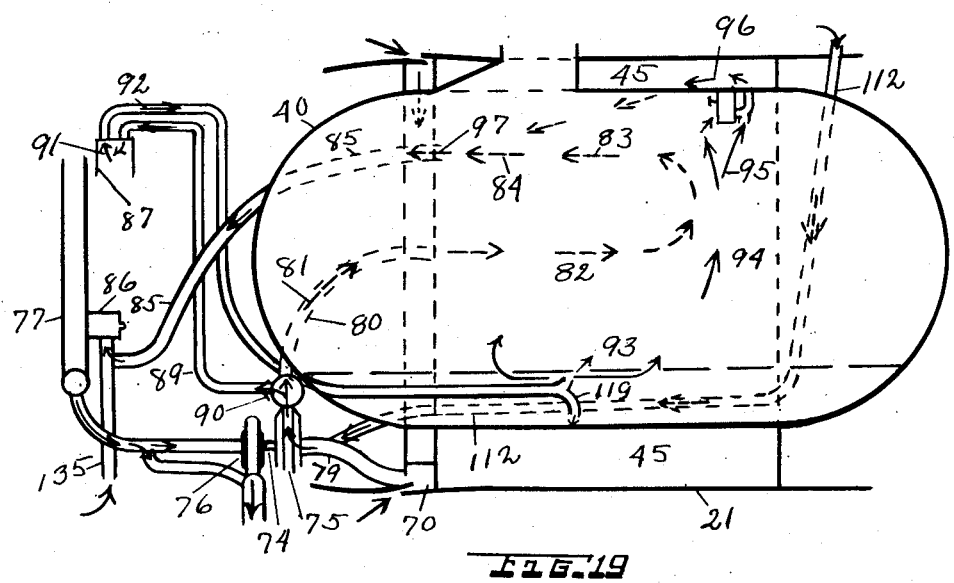

Patented Oct. 21, 1930

1,779,160

UNITED STATES PATENT OFFICE

RICHARD DIEHL, OF NEW YORK, N. Y.

HIGH-ALTITUDE FLYING MACHINE

Application filed April 19, 1929. Serial No. 356,550.

This invention relates to a high altitude flying machine, and its object is to provide a mechanism of this character having a pressure retaining cabin forming a part of the fuselage structure.

A further object is a means to maintain and control the air pressure in the said cabin.

Another object is a means by which air from a compressor may be used to heat the cabin and by which the said air may be cooled by contact with the inner surface of the fuselage skin before its final delivery to the driving motor.

Another feature of the invention is an observation turret, or dome having an endless transparent casing mounted in an air tight frame; which frame is part of the cabin structure.

Another feature is a series of bulkheads and ribs which, together with the cabin walls and the skin of the fuselage form one, or more air tight chambers about the body of the cabin.

Another feature comprises certain forms of slotted intake apertures for the air supply.

These and other objects and features of the invention will be fully set forth and described in the following specification and claims, and illustrated in the accompanying drawings, in which:

Fig. 1 is a side view of an aeroplane illustrating some of the features herein claimed.

Fig. 2 is a plan view taken within the limits of the line 2—2 of Figure 1.

Fig. 3 is an enlarged vertical section within the limits of the line 3—3 of Figure 1.

Fig. 4 is a fragmentary section on the line 4 of Figure 3.

Fig. 5 is a fragmentary section on the line 5 of Figure 3.

Fig. 6 is a section on the line 6—6 of Figure 3 and shows the interior of the cabin and the chamber between it and the outer skin of the fuselage.

Fig. 7 is a section on the line 7—7 of Figure 3 and shows the rear closure bulkhead of the chamber between the cabin wall and the fuselage skin.

Fig. 8 shows a clamping latch on the door of the cabin.

Fig. 9 shows a fragmentary view of the door casing and the fuselage walls.

Fig. 10 is an automatic pressure valve having a diaphragm and closable air chamber.

Fig. 11 is a plan view of the diaphragm seen in Figure 10.

Fig. 12 is a fragmentary view of a window casing with glass set in a resilient marginal binding element.

Fig. 13 is an adjustable cable pull lever.

Fig. 14 illustrates, in an enlarged fragmentary assembly, the gas exhaust turbine, the turbo-compressor coupled therewith, the shift valves of the exhaust line, the piston-compressor which supplies air to the cabin, and an automatic control element which acts to start the turbo-compressor at any specific altitude.

Fig. 15 is a plan view on the line 15 of Figure 14.

Fig. 16 is an enlarged view, partially in section, of the observation dome.

Fig. 17 is a partial section of the dome on the line 17—17 of Figure 16.

Fig. 18 is a fragmentary sectional view of a modified form of the observation dome having a double glass enclosure.

Fig. 19 is a diagrammatic view illustrating the principal air circuits through the cabin and between it and the outer skin of the fuselage.

Referring now to Figures 1 and 2 of the drawings; the aeroplane 20 has a fuselage 21 the construction of which will be later described in detail. A door and windows are provided as seen at 22 and 23 respectively, and on a superstructure 24, wings 25 are mounted. An observation dome 26 is positioned at the forward end of the superstructure. The forward portion 27 of the fuselage is overlapped by the main body and provides the slot 28. A hood 29 encircles that portion of the fuselage in which the motor is located.

The usual form of propeller is shown at 30 and the rudder and stabilizers at 31 and 32 respectively. The customary ailerons are seen at 33. Air intake slots 34 are provided in the wings as shown and these are connected at 35.

Reference will now be had to Figures 3, 4 and 5. The cabin is here shown at 40 and is of cylindrical form and having convex ends. It may, however be of different form and contour if desired. The walls of this cabin are constructed of very thin but strong material and are airtight. At the upper forward portion, the dome 26 is built on to the cabin in such a way as to maintain the airtight construction. This will be described in detail in another part of the specification.

Built into the wall structure of the cabin are encircling transverse bulkheads 41 and 42, and perforated ribs as seen at 43. These do not extend into the interior of the cabin except for the fractional part of an inch seen at 44; this is required for binding the parts together. From the outside of the cabin walls the bulkheads and ribs extend outward and are built into the outer skin of the fuselage. The end bulkheads 41 and 42 form closure walls and thus provide one or more chambers 45 between the cabin and the fuselage as before stated. The ribs 43 however, are perforated as at 46 to allow a circulation of air within the chamber.

Longitudinal beams as 47, 48, 49 etc. are thin in section and are perforated for lightness. These extend lengthwise of the fuselage, and at the portions where they are built into the cabin walls they serve to bind the said cabin and the outer fuselage skin into one integral structure thus forming a combined fuselage and cabin of great strength and lightness.

The construction of the dome 26 may best be understood by reference to Figures 16 and 17 in which the base 53 has a flange 54 which is recessed at 55. A resilient packing 56 is placed in the said recess. The cover element 57 has a flange 58 which is recessed in the same manner as that shown at 54 and it also has a resilient packing in its recess. The transparent casing 59 is of circular and endless formation and may be of glass, or any suitable material and reinforced by wires or by other means if desired. This casing rests within the recesses of the flanges and in the resilient packing elements and is clamped in position by the bolts 60. This construction is obviously airtight.

Referring to Figures 9 and 12, it will be seen that the cabin door 22 is provided with a V rim 64 which has a resilient packing 65. The window 23 which, as used both in the door and fuselage walls, has a pane 66 of transparent material and is mounted in a marginal packing element 67 as shown. An outer pane 68 may be of celluloid or any suitable material, and means may be provided for air circulation between the two. The casing is beveled at the lower portion 69 to permit of better vision.

Referring now to Figures 3 and 4; an annular air intake chamber 70 encircles the fuselage at a point in advance of the observation dome. This chamber has an intake slot 28 which is preferably formed by riveting at intervals as seen in Figure 4. It may, however, be constructed in other ways.

The means for circulating air in the cabin and within the chamber between it and the outer fuselage skin may now be described as follows. Referring to Figure 19 chiefly and in part to Figure 3; a turbo-compressor 75 is driven by a gas turbine 76, a shaft 74 connecting the two. This turbine is actuated by the exhaust gases from the motor which pass out through the pipe 77. The means for the control of these elements will be described later. A pipe 79 carries air from the intake chamber 70 to the compressor 75 from which it passes into the intervening chamber 45 between the cabin and the fuselage skin through the pipe 80. When the compressor is idle the air circulates freely, and when it is running the air is, of course driven with some force. This air current follows the course of the arrows 81, 82, 83, 84 etc. and passes through the pipe 85 to the carbureter 86 from which it passes into the motor.

Air is supplied to the cabin interior by the piston compressor 87 which runs constantly and draws its supply from the compressor 75 through the pipe 89. When the compressor 75 is running the pressure is compounded through the small compressor 87. This air current follows the course of the arrows 90, 91, 92, 93, 94, 95, 96, 97 etc. It will be seen that after it leaves the cabin it enters the chamber 45 and passes on to the carbureter through the pipe 85.

The air from the compressor 75 is heated by compression and is used to warm the cabin, and in passing between the said cabin and the outer fuselage wall it is again cooled by contact with the fuselage skin and is delivered at the proper degree of coolness and density to the motor. Other means may be provided if desired, to heat or to cool the air before its circulation in the cabin and in the adjacent chamber.

The air pressure in the cabin is maintained at approximately ground level density by means of the pressure control valve 100 seen in Figure 3 and shown in detail in Figures 10 and 11. Referring now to these figures; this valve comprises an air chamber 101, a diaphragm 102, a closure valve 103, a piston 104 with a groove 105, and passage vents 106. In use; air is let into the chamber 101 at ground level and the valve 103 is closed thus imprisoning air at approximately 15 lbs. density. Should the air in the cabin under pressure from the compressor 87 be raised to too high a degree; the diaphragm will be pushed up and the piston 104 will rise and allow the air to escape through the vents 106. The valve 107 is used to regulate the normal circulation and passage of vitiated air from the cabin. A check valve 131 in the compressor 87 prevents any back suction from the cabin supply.

The air circulation between the cabin and the fuselage skin in the chamber 45 is created and maintained in the following manner. Referring chiefly to Figures 13, 14 and 15 in conjunction with Figure 3. The turbo-compressor 75 takes air through the pipe 79. A valve 110 in this pipe is controlled by a pull lever 111 on the instrument board in the cabin. Normally, air is used from the intake chamber 70, but in starting and landing it may be taken from the wing slots 34 through the pipe 112. A check valve 114 is placed above the compressor. This compressor 75 may be started by means of the lever 115 on the instrument board, or it may be started automatically at any desired altitude by the regulator 116. This regulator has a closed air chamber similar to that described in the valve 100. A diaphragm 117 having a long range of expansion actuates a piston 118 which shuts off the pipe 119.

A slide element 120 has one aperture only which may be brought into registration with the holes 121 and may be set to release air when the diminishing pressure of high altitude permits the diaphragm to lower the piston 118. A scale 122 is calibrated at specific altitudes. The chamber 123 receives the air when it is delivered through an open aperture and passes it into the pipe 124 which extends to the cylinder 125. This cylinder has a piston which actuates the rod 126 and this is retracted by the spring 127. The rod 126 is toothed and is in mesh with the wheel 134. This wheel is affixed to a vertical shaft and on this shaft are disks 128 and 129 set at right angles to each other.

When an altitude is reached at which it is desired to start the turbo-compressor; air is released from the pipe 119, that is; from the compressor 87, it being diverted from the cabin supply. This is done by the automatic dropping of the diaphragm 117. The air then passes to the cylinder 125 and acts to open the disk valve 128 which passes the exhaust gas into the turbine 76. At lower altitudes the gas is by-passed by the valve 129 to the open atmosphere.

The combined air currents through the pipe 85 may pass into the outer air as when the valve 132 is open as shown; or they may be passed into the carbureter 86 by pulling the valve into its second position by means of the pull lever 133 on the instrument board.

A pipe 135 provides means of independent air intake to the motor and a check valve 136 acts to turn upward the air from the pipe 85.

The cables 136, 137 and 138 may be of wire strands, or of any suitable material.

The chamber 45 is shown encircling the main body of the cabin; but this may be extended to cover the end walls if desired.

A toilet 144 is shown in Figure 3. This is provided with opposed air gates 145 which maintain the air sealing of the cabin.

The modification shown in Figure 18 provides for a double casing having two transparent elements 59. The intervening space may have an air circulation through the pipes 140 and 141 to prevent condensation of moisture on the transparent casing, or may be sealed tightly, as desired.

While the invention is herewith shown in its preferred form; it is understood that such minor changes may be made therein as may come within the spirit and scope of the appended claims without relinquishment of any of the rights inherent therein.

Having thus described the invention, what is claimed as new and desired to be secured by Letters Patent, is as follows:

1. In an air craft of the character described, a substantially air tight cabin the walls of which form a part of the sustaining structure of the fuselage, an intervening and substantially air tight chamber between the wall of the said cabin and the skin of the fuselage, and means to provide a controlled air circulation within the said cabin, and means to provide an air circulation within the said intervening chamber.

2. In an air craft of the character described, a combined fuselage and cabin structure in which the walls of the said cabin form a part of its supporting and bracing elements, an intervening space between the said cabin walls and the skin of the fuselage, means to circulate air within the said cabin and means to pass an air current through the intervening chamber adjacent to the said cabin.

3. In an air craft of the character described, a substantially air tight cabin located within the skin of the fuselage, an intervening and substantially air tight space between the said cabin and the said fuselage skin, bulkheads attached to the structure of the said cabin and to the fuselage skin, rib elements attached to the cabin walls and to the skin of the fuselage, and the whole forming an integral structure in which the fuselage skin and the cabin walls are structurally interdependent, the one on the other, and means to circulate and to control an air supply to the interior of the said cabin and the said intervening space.

4. In an air craft of the character described, a pressure retaining cabin and a fuselage structure built integral with and interdependent on each other, an intervening space between the said cabin and the fuselage skin, and both the said space and the said cabin substantially air sealed except at specific points where controlled vents permit of the passage of air currents, means to supply air under pressure to the interior of the said cabin and means to circulate air about the walls of the cabin and between it and the skin of the fuselage.

5. In an air craft of the character described, a cabin substantially air sealed except at specific and controlled air vents, annular bulk heads connecting the walls of the said cabin with the skin of a fuselage structure, an intervening chamber between the cabin walls and the said fuselage structure, ribs of open construction within the said chamber and secured between the cabin walls and the fuselage, means for outward vision from within the said cabin, air compression means adjacent to the said cabin and air ducts passing from the said compression means to points within the said cabin and the said intervening chamber, and means to conduct the air from the said cabin and the said chamber to the driving motor of the craft.

6. In an air craft of the character described, a substantially air sealed cabin built integral and interdependent structurally with the fuselage of the craft, an intervening chamber between the said cabin and the skin of the fuselage and this also substantially air sealed, controllable air vents in the casing of the said cabin and specific air circulating vents in the walls of the said intervening chamber, air compression means adjacent to the said cabin and means to conduct warm air from the said compression means to the said intervening chamber and to circulate it between the walls of the cabin and the skin of the fuselage, and means to further conduct the said air to the drive motor of the craft.

7. In an air craft of the character described, a substantially air sealed cabin supported within a fuselage structure and a substantially air sealed chamber between it and the skin of the said fuselage, air compression means adjacent to the said cabin and having means to force air into the said cabin and the said chamber through specific vents therein provided, means to conduct the air from the cabin and the said chamber to the drive motor of the craft, and an air intake chamber having slotted communication with the open air, the said chamber being connected with the aforesaid compression means.

8. In an air craft of the character described, a pressure retaining cabin supported within a fuselage structure and integral therewith, and an intervening chamber between the said cabin and the skin of the fuselage, means to force air into the said cabin and into the said chamber, and slotted air intake elements in the structure of the craft, which elements are connected to deliver air into the said air forcing means.

9. In an air craft of the character described, a pressure retaining cabin supported within a fuselage structure and integral therewith, and an intervening chamber between the said chamber and the skin of the fuselage, means to force air into the said cabin and into the said chamber and an annular air intake chamber within the structure of the craft, which chamber communicates with the open air by means of a slot formation and is itself connected with the aforesaid air forcing means.

10. In an air craft of the character described, a pressure retaining cabin supported within a fuselage structure and integral therewith, and an interventing chamber between the said cabin and the skin of the fuselage, means to force air into the said cabin and into the said chamber, and an annular air intake element supported within the structure of the craft and communicating with the open air by means of portions of the fuselage which are overlapped and form a slot which opens forwardly with respect to the said fuselage.

11. In an air craft of the character described, a pressure retaining cabin supported within a fuselage structure and integral therewith, and an intervening chamber between the said cabin and the skin of the fuselage, means to force air into the said cabin and into the said chamber, and means to supply air to the said compression means alternately through separate air intake elements located at different parts of the craft structure, and means to shift the said air supply at the will of the pilot from one intake source to the other thereof.

12. In an air craft of the character described, a pressure retaining cabin supported within a fuselage and having a chamber intervening between it and the skin of the said fuselage, a compressor element with means to deliver air therefrom into the said intervening chamber, an auxiliary compressor element connected to deliver air into the said cabin, and the first mentioned compressor element operatively connected with a gas exhaust turbine, a supply pipe between the said turbine and the exhaust pipe of a driving motor, a by-pass pipe split off from the turbine supply pipe, disk valves in the supply pipe and in the by-pass pipe, and these disk valves set at right angles to each other, and means to simultaneously actuate the said disk valves.

13. In an air craft of the character described, a pressure retaining cabin supported within a fuselage structure and having a chamber between it and the skin of the said fuselage, a compressor element with means to deliver air therefrom into the said intervening chamber, an auxiliary compressor element connected to deliver air into the said cabin, and the first mentioned compressor element operatively connected with a gas exhaust turbine, a supply pipe between the said turbine and the exhaust pipe of a driving motor, a by-pass pipe split off from the turbine supply pipe, oppositely disposed valves in the said supply pipe and in the said bypass pipe and an operating shaft on the said valves, which shaft is rotatably mounted in connection with a piston element, which element is actuated by compressed air diverted from the cabin supply line and passed through a regulator device having a shut off element which is actuated by a mechanism sensitive to variations in the adjacent air density.

14. In an air craft of the character described, a pressure retaining cabin supported within a fuselage structure, a pilot's vision dome built into the structure of the said cabin, a transparent and endless casing forming the side walls of the said dome, and the said casing having its edges set in a resilient packing element and clamped in position by means of marginal flanges and bolts which extend from the upper to the lower of the said flanges.

15. In an air craft of the character described, a pressure retaining cabin mounted integrally with a fuselage structure, an intervening chamber between the said cabin and the skin of the fuselage, means to force air into the said cabin and the said chamber, means to conduct the said air therefrom to the driving motor of the craft and a valve in the said conducting means having a two way passage which may be set to pass the air into the motor supply line and by a second movement may be set to discharge the said air into the outer atmosphere.

Signed at New York city, in the county of Bronx and State of New York, this 10th day of April, A. D. 1929.

RICHARD DIEHL.